April 1, 1930.  C. I. HOAG  1,752,487

SAWING MACHINE

Filed Dec. 28, 1927

Inventor
Charles I. Hoag.
by *[signature]* Att'y

Patented Apr. 1, 1930

1,752,487

UNITED STATES PATENT OFFICE

CHARLES IRVING HOAG, OF CHICAGO, ILLINOIS, ASSIGNOR TO WESTERN ELECTRIC COMPANY, INCORPORATED, OF NEW YORK, N. Y., A CORPORATION OF NEW YORK

SAWING MACHINE

Application filed December 28, 1927. Serial No. 243,047.

This invention relates to improvements in sawing machines, and more particularly to improvements in feed chains for rip saw machines.

The feed chains of rip saw machines are usually provided with a centrally located longitudinal groove or recess for receiving the cutting edge of the saw so as to permit the saw to cut through the material being cut as it is advanced by the chain. In order to prevent splintering and insure a clean and smooth cut it is necessary that the groove in the feed chain be as narrow as possible so that the material being cut may be rigidly supported close to the cutting edge. For this reason it has been the practice heretofore to provide the individual blocks of the feed chain with centrally located removable inserts having a saw groove of the desired narrow width, the inserts being composed of relatively soft material, such as babbitt, to insure against possible damage to the cutting edge of the saw. It is often necessary to replace these inserts due to the upper surfaces thereof becoming worn from usage to such an extent that they fail to afford the necessary support for the material being cut, and in order to make such replacements it has been necessary to remove the feed chain from the machine and then subject it to sufficient heat to melt out the old babbitt inserts.

The principal object of the present invention is the provision in material working machines of an improved, inexpensive and readily replaceable work supporting means.

In accordance with a preferred form of the invention, the individual blocks of the feed chain are provided with readily removable wooden inserts which are mounted under spring tension so as to exert an upward pressure upon the underside of the material being cut. In a modified form of the invention, a pad of soft rubber interposed between the insert and the chain block serves to normally press the insert upwardly in close contact with the bottom surface of the material being cut.

Other features and advantages of the invention will become apparent from the following detailed description, reference being had to the accompanying drawing, wherein Fig. 1 is a fragmentary vertical section of a rip saw machine illustrating a portion of the improved feed chain;

Figure 1:
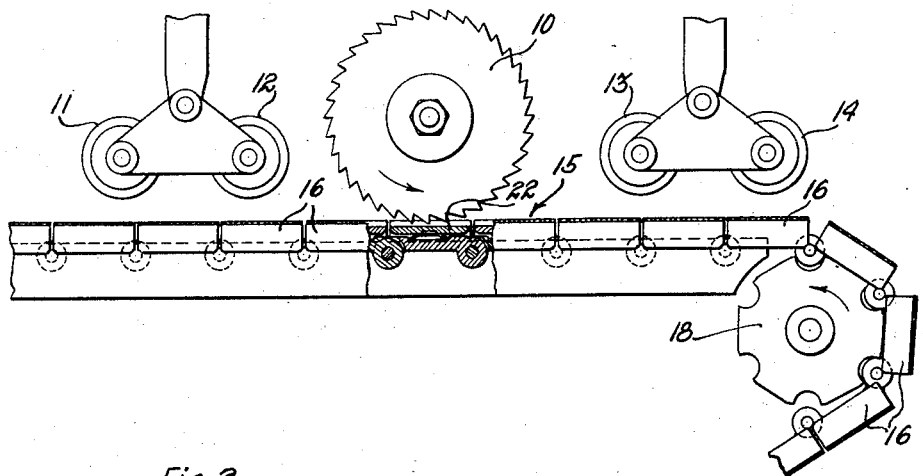
Figure 2:
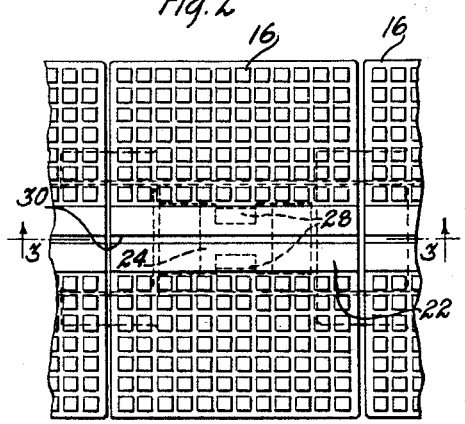
Fig. 2 is an enlarged plan view of one of the blocks of the feed chain shown in Fig. 1.

Referring now to the drawing wherein like reference characters designate corresponding parts throughout the several views, the numeral 10 indicates the usual circular saw and the numerals 11, 12, 13 and 14 indicate the accompanying pressure rollers which are shown somewhat schematically since they do not constitute a part of the present invention. Arranged underneath the pressure rollers and suitably spaced therefrom is the improved feed chain which is designated generally by the reference numeral 15 and comprises a plurality of pivotally interconnected blocks 16—16, the upper surfaces of which are ribbed or grooved so as to firmly engage the material being cut. The feed chain 15 is adapted to ride in the usual manner in a groove or recess provided in the top of the table or bench (not shown), and may be driven by a toothed wheel or sprocket 18 from any suitable source of power (not shown).

Figure 3:
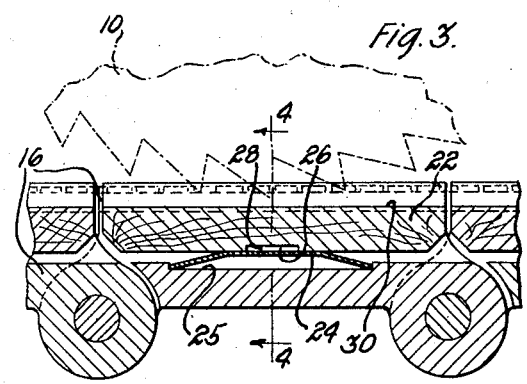
Fig. 3 is a vertical section taken on line 3—3 of Fig. 2.
Figure 4:
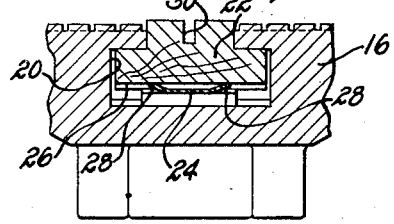
Fig. 4 is a fragmentary vertical section taken on line 4—4 of Fig. 3.

As best shown in Fig. 4, each of the chain blocks 16 is provided with a centrally located dove-tail groove or recess 20 extending longitudinally thereof, and removably mounted in each of these grooves is a block or insert 22 preferably composed of wood. The upper surface of each of the inserts 22 is normally held slightly above the upper surface of the chain block by a resilient member 24 interposed between the underside of the insert and the bottom of the groove 20. The resilient member 24 is in the form of an arcuate leaf spring, the ends of which engage the sides of a recess 25 formed in the chain block (Fig. 3). A transverse groove 26 is provided on the underside of each of the inserts 22 for accommodating upwardly projecting ear portions 28—28 of the members 24 whereby the inserts are securely locked against longitudinal movement within the grooves 20 of the chain blocks.

The inserts 22 are each provided with the usual saw groove or slot 30 which may be of the desired narrow width since the wooden walls of the saw slot can not damage the cutting edge of the saw. By reason of such construction, the material being cut may be firmly supported on the underside thereof as close to the cutting edge as is practicably possible, thereby eliminating splintering and insuring a smooth cut.

The material being cut is pressed downwardly by the rollers 11, 12, 13 and 14 with sufficient force to cause the inserts 22 to be moved downwardly against the tension of the springs 24 so that the upper surfaces of the inserts are flush with the upper surfaces of the chain blocks, thus permitting the engagement of the upper surfaces of the chain blocks with the underside of the material being cut. By reason of the construction and arrangement just described, a constant upward pressure is maintained on the underside of the material being cut, thereby insuring a smooth, clean cut at all times.

When the wooden inserts 22 become worn they may be readily chiselled out and replaced by new ones at a very small cost. Furthermore, it is obvious that such replacements may be made without disassembling the machine or removing the feed chain, since sufficient space is provided between the chain blocks as the feed chain passes around the sprocket 18 for removing an old insert and inserting a new one.

Figure 5:
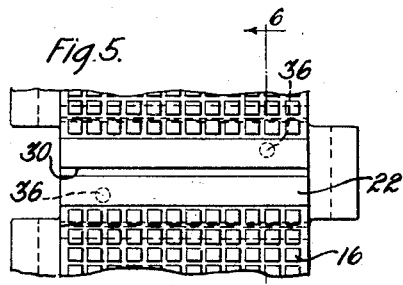
Fig. 5 is a fragmentary plan view similar to Fig. 2 illustrating a modified form of the invention.
Figure 6:
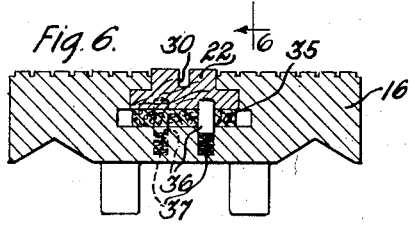
Fig. 6 is a vertical section taken on line 6—6 of Fig. 5.

In the modified form of the invention shown in Figs. 5 and 6, a rubber pad 35 is employed in place of the resilient member 24 for pressing the insert 22 upwardly against the underside of the material being cut. The rubber pad 35, together with the wooden block, are secured against longitudinal movement within the groove 20 of the chain block by a pair of pins 36—36 mouted in suitable apertures provided therefor near each end of the chain block. The pins 36 protrude through the rubber pad 35 and engage suitable apertures provided on the underside of the insert 22. When it is necessary to replace one of the inserts 22, the pins 36—36 are pressed downwardly against the tension of small compression springs 37 so as to permit a new insert to be readily inserted.

It should be understood that the invention is not to be limited by the specific embodiment thereof herein illustrated and described except in so far as is defined by the appended claims.

What is claimed is:

1. In a sawing machine, a saw, a feed chain comprising a plurality of interconnected blocks, each of the blocks being provided with a removable insert having a groove for receiving the saw, a resilient means mounted in the block and positioned between the block and the insert for normally pressing the insert upwardly against the underside of the material being sawed.

2. In a sawing machine, a rotary saw and a feed chain comprising a plurality of interconnected members, each of the members being provided with a resiliently mounted insert for firmly engaging the underside of the material being sawed, the upper surface of the members containing the inserts lying below and in the plane of the saw.

3. A feed chain for rip saw machines comprising a plurality of pivotally interconnected members, each of the members having a readily replaceable insert for engaging the underside of the material being sawed, and a resilient member for normally pressing the insert upwardly against the underside of the material, the upper surface of the members containing the inserts lying below and in the plane of the saw.

4. A feed chain for rip saw machines comprising a plurality of pivotally interconnected material supporting members each having a centrally located longitudinal recess which completely traverses the member, a wooden block disposed within each of said recesses for engaging the underside of the material being sawed, the upper surface of the members containing the inserts lying below and in the plane of the saw, an arcuate spring interposed between the block and the bottom of the recess for normally exerting an upward pressure upon the block, and means for preventing longitudinal displacement of the block within the recess.

5. In a sawing machine, a rotary saw, an endless conveyor chain for supporting and advancing the work, said conveyor chain comprising a plurality of pivotally interconnected work supporting members, each member having a centrally located longitudinal recess, the bottom of said recess lying below and in the plane of the saw, a readily removable insert disposed within each of said recesses for engaging a side of the work closely adjacent to the plane of the saw, and a resilient means interposed between the insert and the bottom of the recess for normally pressing the insert against the work.

In witness whereof, I hereunto subscribe my name this 15th day of December A. D., 1927.

CHARLES IRVING HOAG.